United States Patent [19]

Hampton

[11] 3,717,251
[45] Feb. 20, 1973

[54] METHOD AND APPARATUS FOR FILTERING SOLIDS

[76] Inventor: Quentin L. Hampton, 64 Kent Drive, Ormond Beach, Fla. 32074

[22] Filed: Aug. 19, 1971

[21] Appl. No.: 173,150

Related U.S. Application Data

[63] Continuation-in-part of Ser. No. 69,349, Sept. 3, 1970, abandoned.

[52] U.S. Cl. ...................210/80, 210/104, 210/106, 210/274
[51] Int. Cl. ...........................................B01d 23/24
[58] Field of Search..........210/80, 81, 104, 106, 128, 210/269, 274

[56] References Cited

UNITED STATES PATENTS

| | | | |
|---|---|---|---|
| 3,278,031 | 10/1966 | Rosaen | 210/106 |
| 2,723,761 | 11/1955 | Made et al. | 210/274 X |
| 1,784,893 | 12/1930 | Duden | 210/269 |
| 3,512,640 | 5/1970 | Hellmann | 210/80 |
| 1,954,406 | 4/1934 | Dotterweich | 210/128 X |

*Primary Examiner*—John Adee
*Attorney*—Max Dressler et al.

[57] ABSTRACT

A method and apparatus for filtering suspended solids from a liquid suspension such as sewage, wherein the liquid to be filtered is forced upwardly through a filter media. Upon leaving the filter media, the filtered liquid flows over a weir and into an effluent trough, from where it is directed to an outlet conduit for suitable disposition. The solids entrapped in the filter media during the filtering process are removed therefrom by a cleaning or washing process, which simply involves increasing the rate at which the liquid is passed through the filter media. During washing, the liquid, such as water, is forced through the filter at a rate of flow equal to several times the rate of flow the water moves during filtering, which acts to fluidize the entrapped solids removed from the filter media, enters the effluent trough located above the filter media and because the rate of flow is higher than that during the filtering process, is directed into a compartment spaced away from where the filtered water has been directed. The washwater may then be re-directed through the treatment plant, or to other suitable disposal. The washing operation of the filter can either be pre-set to take place at specified time intervals, or can be initiated upon the establishment of a predetermined back pressure in the filter inlet resulting from clogging of the filter by the solids removed from the water being filtered.

29 Claims, 15 Drawing Figures

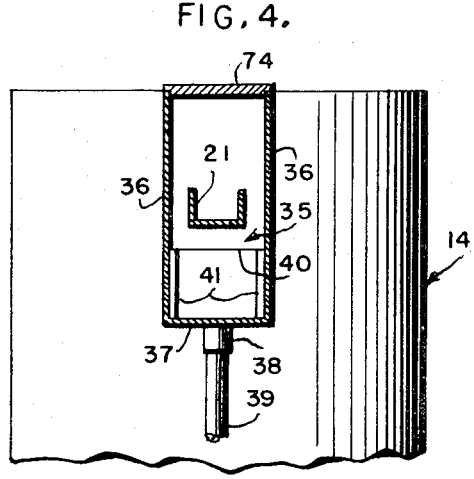
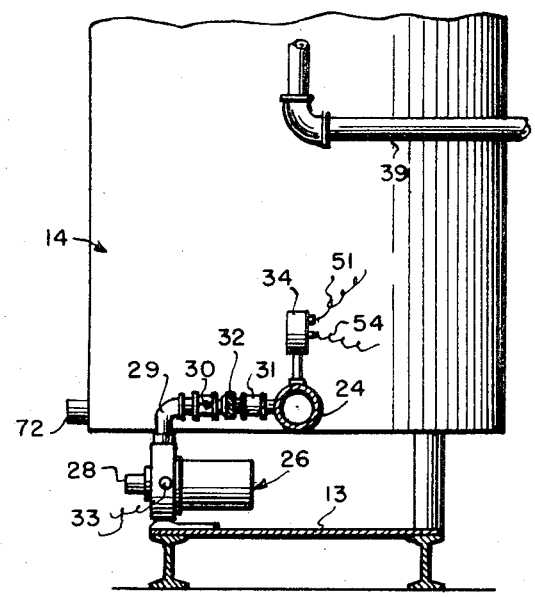
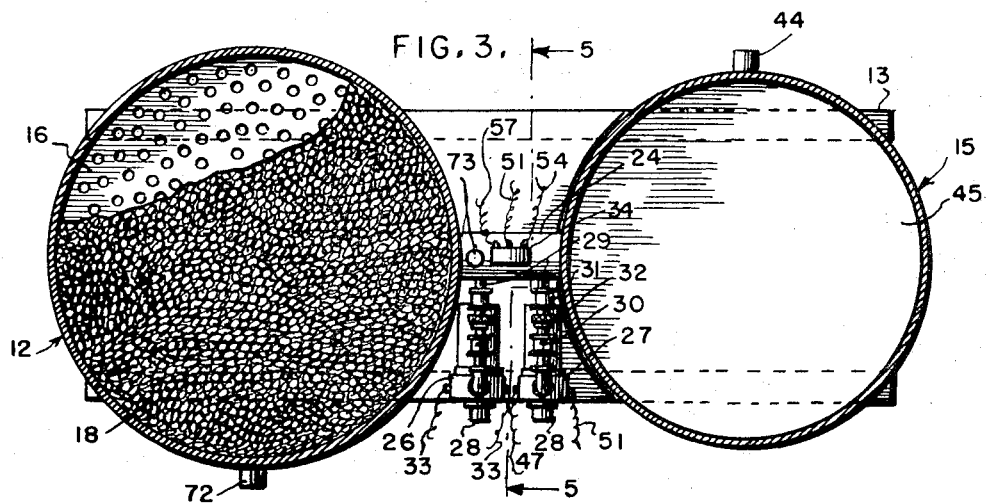

PATENTED FEB 20 1973 3,717,251

METHOD AND APPARATUS FOR FILTERING SOLIDS

This application is a continuation-in-part of application Ser. No. 69,349, filed Sept. 3, 1970, now abandoned in the name of the present inventor.

In existing systems, where it is desirable to remove a high percentage of very fine light solids remaining in waste treatment plant effluents, it is desirable to use a filter, since it is otherwise very difficult to separate such solids from the water in which they are located. Presently available gravity filters are quite complex and difficult to operate and readily plug. In addition, in order to clean such filters, very large reservoirs filled with filtered water are required to make available the quantities of water needed for the washing operation, which generally takes place in a direction opposite to the filtering action. Another problem with such filters is that when they are shut off to permit backwashing of the filters for cleaning purposes, air is often entrapped in the interstices of the filter media, which can bring about an increased head loss across the filter media and a decrease in the filter run time.

There is presently a great need in the waste water treatment field, as well as for other applications, for a filter of simple construction that can bring about nearly complete removal of suspended solids and substantial removal of B.O.D. from plant effluent. With the tremendous emphasis on the "cleaning up" of our water resources, it is very important that we provide a highly efficient filter that is economical to operate. Such a system should be fully automatic, require no separate washwater supply, and employ a minimum of mechanisms.

In accordance with the present invention, there is provided a very simple, but highly efficient, automatically operated upflow filter which, by way of example, is capable of providing almost complete removal of suspended solids and substantial removal of B.O.D. Conventional plant effluents, containing suspended solids and B.O.D. concentrations, can be treated to produce a water with only a trace of suspended solids and as low as 2 ppm B.O.D. The system is especially suited to provide tertiary treatment to upgrade effluents from conventional waste water treatment plants, so as to meet rigid waste water quality control standards.

The novel method of the present invention, which is capable of obtaining such results can be practiced on the illustrated apparatus, which does not require operating valves, rate controllers, or manual controls, and can be automatically operated. The water flows up through the filter in the same direction during both the filtering and washing cycles, which eliminates the possibility of any air lock existing in the filter and the attendant disadvantages thereof. The filter does not require a separate filtered water source for washing purposes, since the water source that is being filtered can also be used for washing the filter media at a higher flow rate than for filtering.

The present invention incorporates a washing system utilizing the hydraulic characteristics created by the use of two greatly different volumes of water flow when filtering and when washing, respectively, within a discharge trough of fixed dimensions. The different velocities created in the discharge of the water carrying trough above the filter media produce two different flow trajectories and proper location of a baffle in a discharge receiving area permits complete separation of filtered water flow from washwater flow. Essentially, the filter is cleaned by simply increasing the rate at which the water flows through the filter media, which expands the filter media and allows the entrapped particles to be removed from the filter media and carried off into a completely separate area from that into which the water is directed during the normal operation of the filter. Further, it has been discovered that no devices are required to control fluidizing of the bed except volumetric flow to the unit during washing. Also, it has been found that with this system, dispersion of air bubbles in the washwater supply to the filter during washing operations will not agitate the filter media bed to the extent that filter media is lost in the washwater.

Various mechanisms can be provided to effect washing of the filter by substantially increasing the flow through the filter. Such mechanisms can be designed to respond to a buildup of pressure in the inlet of the filter due to clogging, or they can be designed to operate at selected time intervals.

For example, in the embodiment illustrated, a pump having a flow rate on the order of 3 gallons per minute per square foot of filter surface area is employed to direct plant effluent through the filter during the filter cycle. The water is pumped through the filter and the solids to be filtered out are entrapped in the filter media, which, in the illustrated embodiment, consists of fine sand particles. The filtered water flows over weirs into a trough disposed above the filter media and flows out of the trough into a chamber which it leaves through an outlet pipe to a disposal area.

When the filter becomes clogged, the pressure in the inlet of the filter builds up, which pressure is sensed, and when it reaches a prescribed level acts to operate a second pump that introduces water into the filter at a rate that is some multiple of the flow rate produced by the filter pump, say, on the order of five times the rate of the filter pump, which would be about 15 gallons per minute per square foot of filter surface area. The total flow through the filter of 18 gallons per minute per square foot of filter surface area acts to fluidize the filter media and thus buoys the entrapped particles and imparts to the filter media a violent, turbulent, fluid-like motion. Maximum cleaning action will occur during washing when the filter media is just fluidized. Greater expansion merely serves to separate the grains enough to allow the solids to be washed free of the media. There is sufficient vertical distance provided between the top of the discharge weirs and the filter media surface when unexpanded and operating to filter at the low flow rate, so that the expansion of the filter media described above, which accompanies the multiple increase of the rate of fluid flow, does not cause the upper surface of the expanded filter media to rise to the weir level. The expansion of the filter media may be on the order of 10 to 30 percent and so the trough weirs are placed above this expanded level to prevent wasting of the media.

The vertical velocity of the washwater will be suitable to carry the entrapped effluent solids upwardly into the trough located above the surface of the expanded fluidized filter media, but insufficient to carry filter media to this level. The high rate of flow at which the liquid enters the trough during the cleaning action results in the water flowing out of the trough at such a velocity as to carry the washwater over the chamber which the filtered water entered. The cleaning water containing the solids removed from the filter media flows from the discharge end of the trough into a second chamber leading, for example, to a separate reservoir, for whence it is returned to the inlet end of the treatment plant, or other suitable means of disposal.

In one of the illustrated embodiments, a washwater holding tank that drains back to the treatment plant is provided adjacent the tank containing the filter media for receiving the washwater and solids removed from the filter. In this system, when the level of the washwater in the holding tank reaches a preselected level, a float-operated switch mechanism located therein acts to shut off the washing cycle. The flow between the holding tank and the treatment plant is controlled by a restricted orifice located in the bottom of the holding tank. The utilization of a separate holding tank and related switching mechanism is but one way of practicing the present invention. As will be described later, other mechanisms can be used for controlling the washing cycle. These could include various timing mechanisms that may be pre-set or may be designed to be actuated when a predetermined filter back pressure is reached. These timing mechanisms could replace the above-mentioned float-controlled switch. Also, if the washwater was to be directed to some other disposal area, the utilization of a timing mechanism could eliminate the need for the washwater holding tank.

The particular method forming a portion of this invention can be practiced by the several embodiments illustrated herein, as well as other embodiments that fall within the scope of the claims directed to the novel method. The particular apparatus disclosed herein is also novel and will be understood by referring to the following drawings, wherein:

FIG. 3 is a horizontal sectional view taken along line 3—3 of FIG. 2;

FIG. 4 is a fragmentary vertical sectional view, taken along line 4—4 of FIG. 1;

FIG. 5 is a fragmentary vertical sectional view, taken along line 5—5 of FIG. 3;

FIG. 6 is an enlarged fragmentary horizontal sectional view taken along line 6—6 of FIG. 2;

Figure 8:
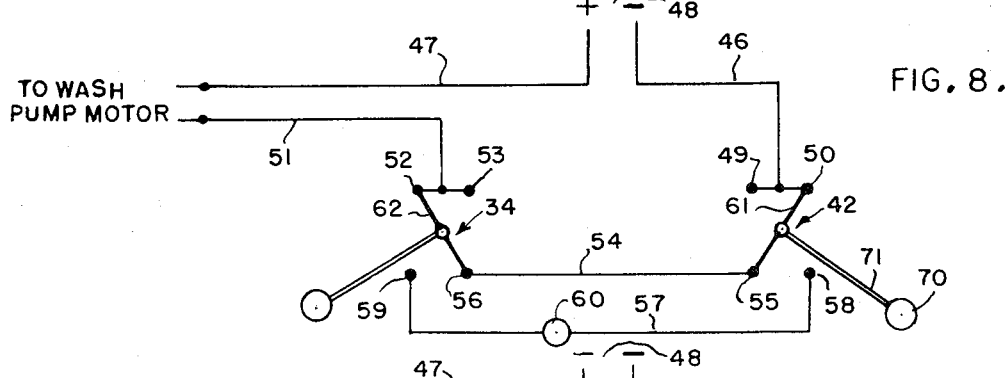
Figure 9:
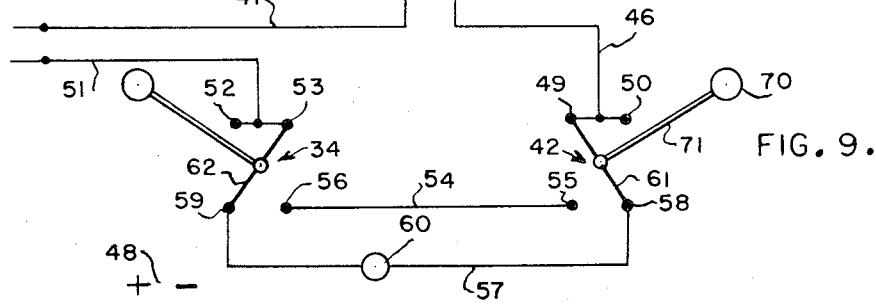
Figure 10:
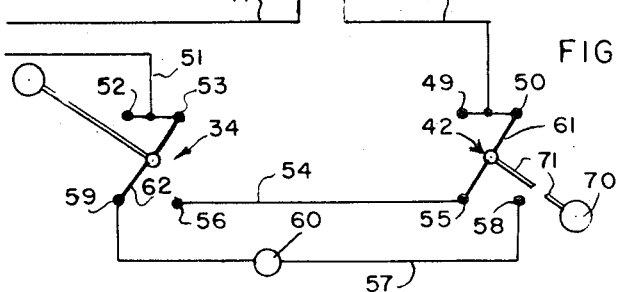
Figure 11:
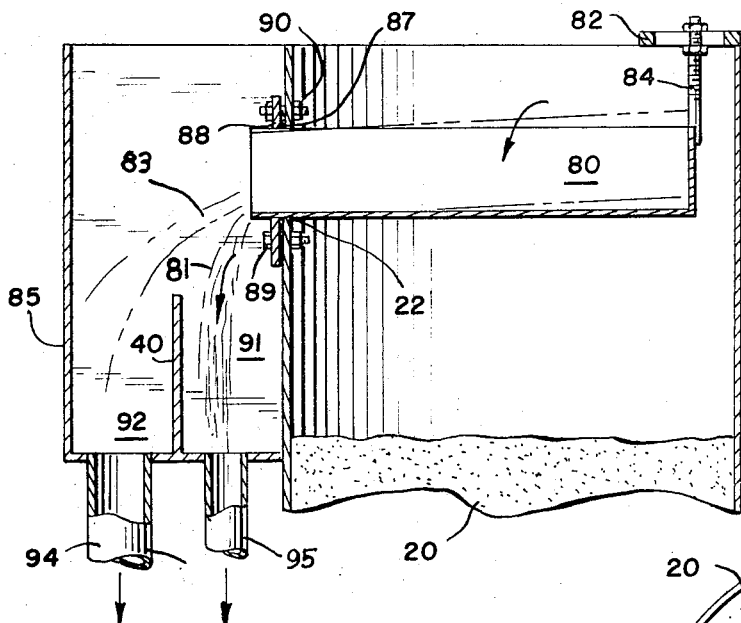
Figure 12:
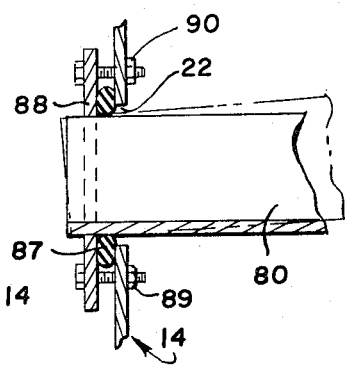
Figure 13:
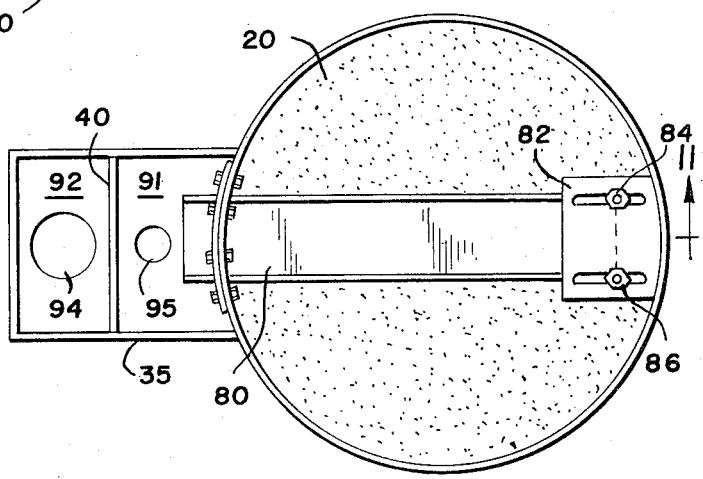
Figure 14:
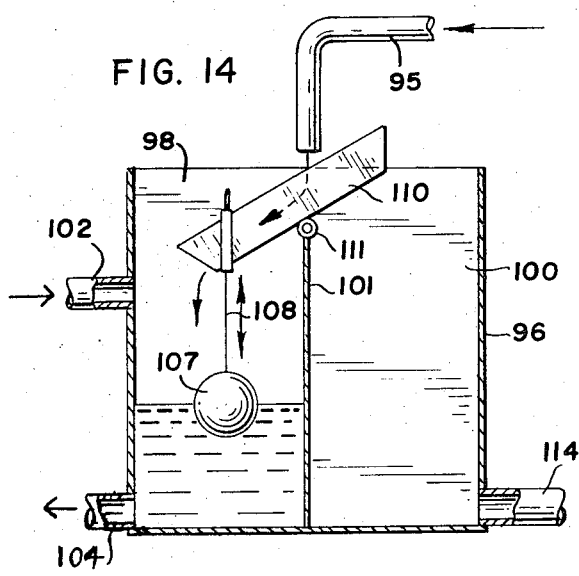

FIGS. 8, 9, and 10 are diagrammatic views illustrating the electric circuit of the wash-pump motor, showing the different positions of the switches thereof;

FIG. 11 is a schematic view taken along line 11—11 of FIG. 13 showing a second embodiment of the invention employing a tiltable trough;

FIG. 12 is an enlarged view illustrating the sealing mechanism for the trough relative to the tank wall;

FIG. 13 is a plan view of the embodiment shown in FIG. 11;

FIG. 14 is another portion of the embodiment shown in FIG. 11; and

Figure 15:
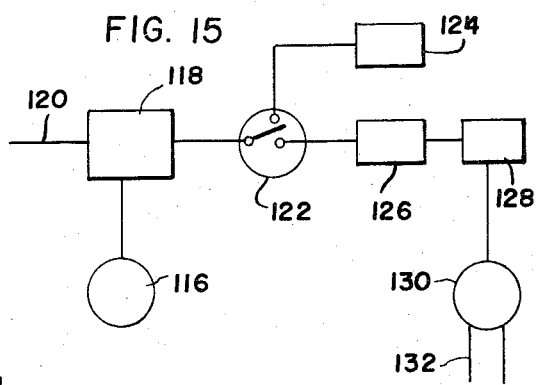

FIG. 15 is a schematic diagram showing various types of automatic operation for starting the wash pump.

Figures 1, 2:
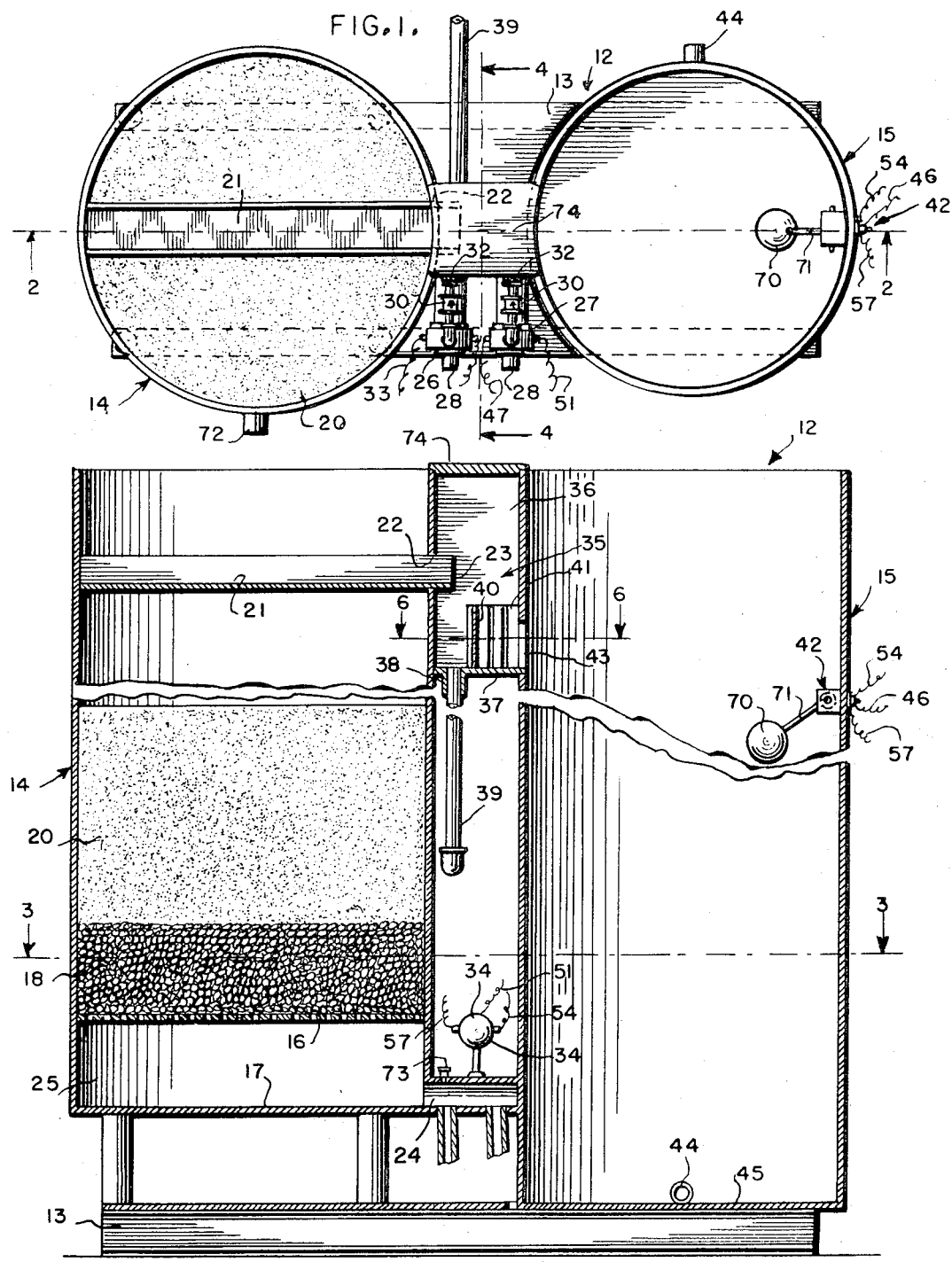
FIG. 1 is a top plan view of one embodiment of an automatically operated upflow filter.
FIG. 2 is a fragmentary vertical sectional view thereof taken along line 2—2 of FIG. 1.

Referring first to FIG. 1, there is shown in plan view an automatic upflow filter forming the essence of the present invention. The filter in its entirety is designated 12 and is shown mounted on a supporting base 13. In this embodiment, it includes a filter tank 14 and a washwater holding tank 15.

The filter tank 14 has mounted therein a grate 16 that is spaced upwardly from the bottom 17 thereof. Located on the grate 16 is a layer of gravel 18 which, if desired, could consist of several separate layers, for example, a lower layer made up of 1½ inch to ¾ inch gravel, an intermediate layer of ½ to ¼ inch gravel, and a top layer of number 14 crushed stone. Located on top of this gravel is the principle filter media, which in this case is a column of substantial height of filter sand, for example, well graded sand with an effective size of 2 mm indicated by the numeral 20. However, while sand is illustrated, the filter media could consist of granulated activated carbon, anthracite, ion exchange resins, garnet granules, synthetic or natural zeolites, or other suitable materials.

Located above the layer of sand 20 is a layer of water and above the water is a weir and trough 21 into which the filtered water flows during the normal filtering operation. The filtered water flows into the trough 21, which trough extends through an opening 22 in the tank wall. The other end of the trough is closed by the opposite wall of the tank. The open end 23 of the trough extends into a box-like chamber 35, which will be described later.

Liquid to be filtered flows in through an inlet manifold 24 into the chamber 25 of the tank 14 formed between the bottom wall 17 of the tank and the grate 16. The manifold 24, while illustrated as a single pipe, can be a plurality of ducts and outlets located in chamber 25 to aid in uniformly distributing the flow across the filter surface area. The liquid is pumped into manifold 24 and chamber 25 through conduit 29 by a filter pump 26, the inlet of which communicates with a fluid reservoir 66 containing the water to be filtered through a suction pipe 67.

The pump outlet line 29 includes a check valve 30 which opens away from the pump 26 and toward the manifold 24, a gate valve 31, disposed between the check valve 30 and manifold 24, and a union 32 between the valve 30 and 31. The pump 26 is connected to any conventional source of electric current by wiring 33 in which there may be interposed an automatic or manual switch, not shown, for making and breaking the electric circuit.

Returning now to a description of the upper portion of the filter, the trough 21 extends into a an effluent box 35 located between the filter tank 14 and the washwater holding tank 15. This box includes sidewalls 36 and a bottom 37. Located in the bottom wall 37 of the box 35 is an outlet port 38 for the filtered water, which connects to a conduit 39 through which the filtered water is carried off. It is to be noted that the outlet port 38 is close to the left-hand sidewall of the box 35 and is located almost immediately below the open end 23 of the trough 21.

Located almost intermediate the bottom wall 37 between the adjacent walls of the tanks 14 and 15 is a baffle or partition 40, which separates the portion of the box 35 leading to the outlet port 38 from the portion of the box 35 leading to the inlet port 43 opening into the tank 15. The baffle plate 40 can be placed in various positions between the adjacent sidewalls of the tanks 14 and 15 due to the location of grooved plates 41 connected to the sidewalls 36 of the box 35 (see FIG. 6). With this arrangement of the baffles 40 splitting the box 35 into adjacent chambers leading into outlet 38 and outlet 43, respectively, the water flowing out of the trough 21 will flow through the outlet port 38 into conduit 39, or through port 43 into the tank 15, depending on the velocity of the water as it leaves trough 21 and enters box 35. If the rate of flow is low, the water will flow off the end of the trough into the portion of the box 35 immediately adjacent the wall of the tank 14 and flow through the outlet port 38 into conduit 39. If, however, the liquid leaves the trough with a correct forward velocity, the fluid leaving the trough will have a trajectory terminating beyond the baffle 40 and flow into the chamber formed between the baffle 40 and the wall of tank 15 and thus flow through the port 43 into the washwater holding tank 15. This will be better described in the method of operation at the end of the specification.

In the illustrated embodiments of FIGS. 1–7, during normal operation of the filter, the electric filter pump 26 is on continuously and the fluid to be filtered is pumped through the manifold 24 into the chamber 25. The water moves up through the gravel, which acts to support the finer filter media and distribute the flow, and the sand acts to filter out the small particulate matter in the water. The filtered water then flows upward over the weir and into the trough so designed as to discharge at a relatively low velocity, it enters the box 35 to the left of baffle 40 and flows out through the outlet 38 and conduit 39 to a point of disposal. However, during the filtration process, the solids that are filtered from the solution act to fill the interstices of the filter media with a resultant increase in the back pressure of the water in the chamber 25. When this back pressure reaches a predetermined value, it is time to clean the filter, which can be done by substantially increasing the upward velocity of the water through the filter media by a filter wash pump connected to the reservoir containing the liquid to be filtered. The filter wash pump 27 communicates with the treated fluid reservoir 66 through a conduit 68 connected to the pump at connection 28. The outlet of pump 27 connects to manifold 24 through conduit 29. Outlets of both the filter and the wash pump are directed into a single conduit leading to the filter. As in the case of pump 26, the outlet line 29 from wash pump 27 includes check valve 30, which opens away from the pump, gate valve 31, between the check valve 30 and manifold 24, and union 32 between the valves 30 and 31.

In the illustrated embodiment of FIG. 1–10, the wash pump is actuated in response to a build-up of pressure in the filter inlet due to clogging when the washwater holding tank is below a certain level. The pressure in the inlet manifold 24 is sensed by a pressure-responsive electric switch 34 that is mounted thereon. The level of liquid in the washwater holding tank 15 is sensed by a conventional double-throw float switch 42 that is positioned at the desired level below the inlet port 43. The operation of the float switch will be described in further detail when the electric circuitry illustrated in FIGS. 8–10 is described. It remains to note that the tank 15 has a restricted outlet port 44 located adjacent the bottom 45 thereof.

When the wash pump 27 is actuated, a very large quantity of water, on the order of five times that normally flowing through the inlet manifold 24, is added to the flow rate, which acts to fluidize the filter media and force the entrapped particles into the fast moving water stream, which stream moves at a high velocity into the trough 21. The fast moving water and entrapped particles entering the trough discharge from the trough 21 at a high velocity and the subsequent stream passes above the baffle 40 and flows through the outlet port 43 into the tank 15. During the washing operation, the filter media expands on the order of 10 to 30 percent, but the system is designed so that the sand will not be carried out of the filter with the washwater.

The electrical circuit interconnecting the double-throw float switch 42 and the pressure-responsive switch 34 is illustrated in FIGS. 8, 9, and 10. The electric circuit includes conductor wires 46 and 47, which lead from a conventional electric current source 48. The wire 47 leads directly to a terminal of the motor of the wash pump 27 and the wire 46 connects with two contacts 49 and 50 of the double-throw switch 42. A conductor wire 51 leads from the other terminal of the pump 27 to two contacts 52 and 53 of the pressure-responsive switch 34, which also constitutes a double-throw switch. A conductor wire 54 connects a contact 55 of the switch 42 to a contact 56 of the switch 34 and a conductor wire 57 connects a contact 58 of the switch 42 to contact 59 of the switch 34. A time-delay switch 60 is interposed in the wire 57. The interaction of these various components is discussed below.

Referring to FIG. 8, there is illustrated the position of the switches when the washing cycle is to begin. The float 70 of the switch 42 is shown in the down position as the tank is empty due to there being no liquid introduced thereto and it being earlier emptied through conduit 63. In this situation, the conductor bridge 61 of the switch 42 is in engagement with the contacts 50 and 55. Due to the clogging condition of the filter, the switch 34 is likewise in a closed position due to a pressure build-up in the manifold 24, so that its conductor bridge 62 is in engagement with the contacts 52 and 56. Consequently, a circuit will be closed through the wire 47 to the motor pump 27, through wire 51, contact switch 62, wire 54, contact bridge 61 and wire 46 to the current source 48, to energize the motor of the pump 27 to pump liquid into manifold 24 from tank 66 along with filter pump 26 that is continuously operating. With both pumps 26 and 27 in operation, there is a large increase in the upflow rate of water through the filter media 20, which due to the forces imposed thereby fluidizes and carries out of the filter the solids lodged therein, which caused the clogging.

For example, the pump 27 pumps five times the amount of water pumped by the pump 26, which if the pump 26 is pumping at the rate of 3 gallons per minute per square foot of filter surface area, the pump 27 will be pumping at a 15 gallon rate, or a total of 18 gallons per minute per square foot of filter surface area is flowing through the filter. This flow rate is sufficient to remove and carry out the solid particles from the filter media upwardly into the trough 21. The rate of flow and velocity of the washwater containing the solids, exiting from the discharge end 23 of the trough 21, causes the washwater to discharge above the baffle 40 and through the port 43 into the washwater holding tank 15. None of the washwater leaving the trough during washing will enter the filtered water outlet port 38.

Figure 7:
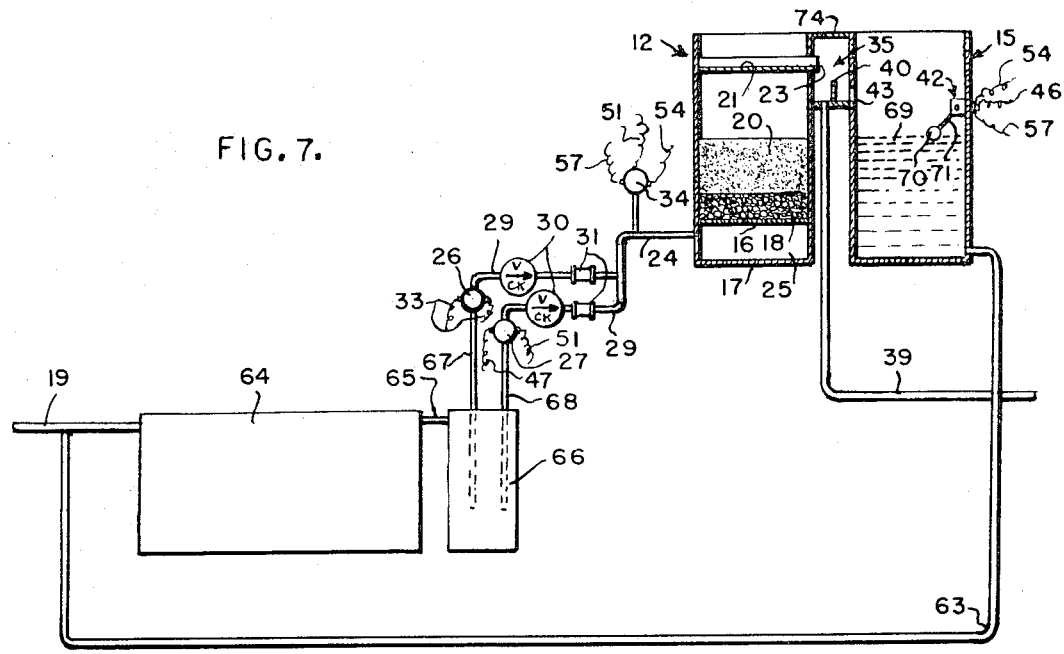
FIG. 7 is a view partly diagrammatic and partly in vertical section, on a reduced scale, illustrating a complete system incorporating an automatic upflow filter.

The washwater and solids carried thereby will flow from the tank 15 through the outlet port 44 at a rate substantially less than the rate at which the washwater enters the tank through the port 43, so that the water level will rise in the tank 15. A conduit 63 leads from the outlet 44, as shown in FIG. 7, and connects with a flow line 19 that discharges into a sewage treatment plant 64 for returning the washwater to the plant 64. The plant 64 has an outlet 65 discharging into a treated fluid reservoir 66, which may constitute a tank or pond. As previously mentioned, water from the reservoir 66 is drawn into the pumps 26 and 27 through suction conduits 67 and 68 which lead from the interior of the reservoir 66 to the inlets of the pumps 26 and 27, respectively. Accordingly, the washwater from the holding tank 15 is recycled through the treatment plant 64 and back to the filter tank 14.

When the liquid level 69 in the tank 15 has risen sufficiently above the point shown in FIG. 7, it raises the float 70 from its position in FIG. 7 and, as illustrated diagrammatically in FIG. 8, to the position shown in FIG. 9. When this occurs, the conductor bridge 61 of the switch 42, due to the fact that the float 70 is connected to the bridge 61 by a rigid float arm 71, will be swung from its position of FIG. 8, where it is in engagement with the contacts 50 and 55, to the position shown in FIG. 9, where it is in engagement with the contacts 49 and 58 of switch 42, causing the circuit to break and the wash pump 27 to shut off. As the filter media 20 will have been washed and the flow reduced due to the shut-off of the wash pump, the pressure in the manifold 24 is reduced sufficiently to cause the switch 34 to resume an open position wherein the bridge 62 is out of engagement with the contacts 52 and 56 and is in engagement with the contacts 53 and 59. The contacts 58 and 59 are connected by the wire 57 in which is interposed the time-delay switch 60 that maintains the circuit of FIG. 9 open for a predetermined time interval, such as five minutes, after the conductor bridges 61 and 62 have engaged the contacts 58 and 59, respectively. During this time interval, the water will escape from the tank 15 through the conduit 63 to allow the float switch to resume its previous position, as seen in FIG. 10, in which the circuit is open, because the switch 34 is in its open position with its bridge 62 out of engagement with the contact 56 thereof.

With the switches 34 and 42 disposed either as shown in FIG. 9 or FIG. 10, the wash pump 27 is inoperative and the filter pump 26 is operating alone. The filtered water rising above the filter media 20, when only the filter pump 26 is operating, will overflow into the trough 21 at a sufficient flow rate, so that it will discharge from the open end 23 thereof into the chamber at the bottom of the box 35 formed between the tank 14 and baffle 40, so that this filtered water will be carried off through the filter water conduit 39. The filter tank may be provided adjacent its bottom with a drain port which is normally closed and sealed by a removable cap 72.

Means may be provided in the various embodiments whereby chemicals may be introduced into the inlet conduit. Also, air may be introduced into the filter, which compressed air may be supplied to produce dispersed bubbles in the washwater and media mixture to agitate the filter media particles in such a manner as to assist in release of trapped material in the media. These bubbles cause more violent agitation of the media than by washing with a relatively high flow rate of washwater alone. The application of air along with water when washing does effectively clear the filter in a reduced period of time and by so doing the amount of water necessary to clean the filter is substantially reduced, thus permitting the use of a smaller washwater holding tank 15. Schematically illustrated in FIG. 2 are conduits 75 and 76 through which chemicals and air may be introduced into the filter inlet. Also, the filter may constitute a biochemical reactor unit, since the biological particles filtered by and through the media 20 will be contained in the media, until it is washed to act upon dissolved solids in the liquid to effect further purification thereof.

Referring to the embodiments shown in FIGS. 11–14, there is illustrated in FIG. 11 a mechanism for effectively adjusting the position of the filter trough 80 in both the horizontal and vertical directions. To this end, the inner end of the trough 80 is connected by adjusting bolts 84, 86 to a slotted trough support plate 82. It can be appreciated that the adjacent end of the trough 80 can be moved up and down by adjusting the position of the bolts 84, 86. The left-hand or exit end of the trough 80 extends through the opening 22 in the wall of the tank 14, which opening 22 is sealed by the utilization of an O-ring rubber and neoprene gasket 87 located between a seal plate 88 and the opening 22. The seal plate 88 is held in position to compress the O-ring 87 to seal the opening 22 by bolts 89, 90. Completing the description of FIG. 11, it will be noted that the outlet end of trough 80 is located above the chamber 91 located between the baffle 40 and the sidewall of tank 14, and this chamber leads to an outlet 95. The left-hand portion of the box 35 forms a chamber 92 between the baffle 40 and the outside wall of box 35 which is connected to a washwater outlet 94. During the filtering action, the water flows out of the end of trough 80 in a trajectory indicated by the flow lines 81. However, during the washing cycle, the washwater is moving at a high velocity and flows out of the trough 80 over the partition 40 into the chamber 92 in a trajectory indicated by the flow lines 83.

When employing the filter embodiment shown in FIG. 11, the filtered water outlet is directed to a tank 96 (see FIG. 14) in which is located a raw water inlet chamber 98 and a filtered water chamber 100 that is formed by a water-tight bulkhead 101 located intermediate the tank 96. Leading into the raw water inlet chamber is an inlet 102 from a sewage plant, or other source. This raw water comes in at a variable rate of flow.

Leading from the raw water inlet chamber 98 to the filter 12 is an outlet 104 that leads to the inlet of the filter and wash pump of FIGS. 1-10.

The filtered water outlet 95 from the embodiment shown in FIG. 11 leads into a tilting trough 110 that is hinged at 111 on the center wall 101. The position of the tilting trough 110 is controlled by a float 107 located in the raw water inlet chamber 98. The float is connected to the tiling trough 110 by a rod 108. With this arrangement, the filtered water is discharged at the same rate as the raw water inlet flow, while at the same time maintaining a constant filter pump rate. It can be appreciated that this can be accomplished, since as long as the float is in the down position, the filtered water leading from the conduit 95 will flow into the trough and chamber 98, but when the float reaches a position where the trough extends down into the filtered water chamber 100, the filtered water will be directed into the chamber 100 and will move out through conduit 114 to a point of disposal.

Referring finally to FIG. 15, there is shown a system providing for two methods of automatically operating the wash pump motor herein indicated at 116. The wash-pump motor 116 is operated by an automatic starter switch 118 which receives current from an electrical power source indicated at 120. One of the automatic systems included a time clock switch 124 and thus when the manual double-throw switch 122 is moved to a position to interconnect the time clock switch 124 with the automatic starter switch 118, the wash-pump motor will be turned on at the time set by the standard time clock switch. This may be set to cause the wash-pump motor to cut in on any day of the week, as many times a day as desired, or for as long a period (in increments of perhaps 15 minutes), as desired.

If the manual double-throw switch 122 is set in the lower position, it will place into service the pressure sensing switch 130 and disconnect the time clock switch. Operation in this manner begins with the pressure switch, which is connected hydraulically through pressure conduit 132, that communicates with the filter inlet to cause the pressure switch to be in the "on" position, when pressures in the filter are elevated due to its being in need of washing. When the pressure switch is in the "on" position, it actuates the time delay switch 128, which delays power supplies for 30 seconds to 1 minute, after which it allows power to be supplied to a time sequencer switch 126. This sequencer switch 126 is designed to be adjustable for the purpose of allowing the operator to set it for washing cycles, usually between 20 and 30 minutes. When the time sequencer switch 126 is in operation, it will activate the automatic starter switch that supplies power to the wash pump motor. After the time sequencer switch has run for the period it was set, it will cut off power to the starter switch 118, thereby causing the wash-pump motor 116 to stop. As it takes several seconds for the pressure in the filter inlet to return to the lowest operating pressure when the filter is clean, the time delay switch 128 between the pressure switch 130 and the time sequencer switch 126 will keep the pressure switch from activating the circuit until normal filtering operating pressures are realized.

With both of the above-mentioned systems, there is no need for the washwater holding tank if the washwater is not returned to the treatment plant and is directed to any other disposal area. If they were used with a holding tank, the float switch would no longer be necessary.

The novel method of operation of the illustrated embodiment of the present invention is as follows:

The water containing suspended solids to be filtered flows from a treatment plant 64 into a storage reservoir 66 for the water that is to be filtered. The water in the reservoir 66 is pumped through a conduit 67 by a filter pump 26, which pump directs the water through conduit 29 and inlet manifold 24 into the chamber in tank 14 below grate 16. The plant effluent is forced upwardly through the gravel bed 18 and sand filter media 20 into a trough 21 located above the media in the upper portion of the tank 14. The rate of flow of the water being forced through the filter during the filtering operation, i.e., on the order of 3 gallons per minute per square foot of filter surface area, is such that the filtered water in the rough 21 flows out the open end 23 of the trough and flows downwardly into the chamber formed between the tank 14 and baffle 40 through the outlet 38 in the bottom of the effluent box 35.

When the filter is clogged by the solids filtered out of the water being directed therethrough, the pressure in the manifold 24 increases, which increase in pressure is sensed by a pressure-responsive electric switch 34. When the pressure reaches a predetermined amount, the wash pump 27 is started through the actuation of suitable electric circuitry. The wash pump is designed to introduce into the manifold 24 and bottom of tank 14 water flowing at a rate on the order of 15 gallons per minute per square foot of filter area. The high volume of wash-water, i.e., on the order of 18 gallons per minute per square foot of filter surface area, which is the total being pumped by the continuously operating filter pump and the wash pump, enters the bottom of the tank 14 and moves upwardly through the filter. This high flow of water acts to fluidize the filter media and free the solid particles entrapped therein and force them upwardly, along with the water, into the trough 21. The high quantity of washwater flowing into the trough 21 moves out of the trough 21 at a high velocity and passes above the partition 40 into the chamber adjacent outlet 43 and then flows into holding tank 15. When the level of the water in the washwater storage tank 45 reaches a predetermined level, the float actuated switch 42 therein is actuated, resulting in the wash pump 27 being turned off, whereafter the system will again function to filter the water being pumped thereto by the filter pump 26.

Various other automatic systems may be employed for actuating the washing cycle other than the one described above.

While several embodiments of the invention have been illustrated, it is, of course, intended to cover by the appended claims all the embodiments that fall within the scope of the present invention. For example, while two pumps have been illustrated, a single pump having two different flow rates could be employed, or a series of pumps could be used that could cut in at different times, as selected.

Similarly, the filter can be fed by gravity, thus eliminating the need for a filter pump. Also, a two-pump system could be used in which the filter pump would only be operated during the filtering and the wash pump would be of a large enough capacity so that it could supply sufficient washwater through the filter independent of the filter pump. The filter pump would be shut off when the wash pump was actuated and the filter pump would be re-actuated when the wash pump was shut off.

Also, while a longitudinal trough arrangement has been illustrated, other arrangements could be used, such as a donut shape, if desired. Furthermore, while the washwater supply has been illustrated as consisting of a reservoir fed by a treatment plant, the washwater could be taken from a separate tank or pond. Various types of filter media could be used, which may require different flow rates during the filtering and washing cycles.

What is claimed is:

1. A method of filtration of a liquid containing suspended solids, which comprises passing a volume of liquid plus solids of relatively low density through an inlet zone to and upwardly through a filter bed of particulate solids of higher density to a liquid receiving zone above said bed at a first flow rate wherein the bed will remain in a non-fludized state, discharging clarified liquid from said liquid receiving zone above said filter bed into a first zone through a flow course, sensing the liquid pressure in said inlet zone, effecting liquid movement upwardly through the filter bed at an increased flow rate when a predetermined back pressure exists in said inlet zone due to clogging of said bed of particulate solids sufficient to induce a fluidized state for the particulate solids of said filter bed and to entrain the lower density solids causing said clogging, passing said latter liquid and entrained solids to said liquid receiving zone, discharging said latter liquid and entrained lower density solids through said flow course positioned above the filter bed, the increased flow rate of said latter liquid producing a velocity which projects the liquid plus entrained solids into a second zone separate from said first zone.

2. A method as set forth in claim 1 in which a first pump is used to pump the volume of liquid through a conduit into the inlet zone at a first flow rate and a second pump for pumping liquid into the same conduit at a second higher flow rate, which combined flow rate effect fluidizing of the filter bed and removal of the particulate solids clogging said bed.

3. The method as set forth in claim 1 in which the second flow rate is on the order of several times the first flow rate.

4. The method as set forth in claim 1 in which a first pump is used to pump the volume of liquid into the inlet zone at a first flow rate and a second pump is used for pumping liquid into the inlet zone at a second higher flow rate on the order of several times the first flow rate at which time the first pump would be rendered inoperative for the period of time that the second pump is in operation and rendering said first pump operative upon conclusion of the operation of said second pump.

5. The method as set forth in claim 2 in which the second zone includes a holding tank and the level of the liquid in the second zone is sensed and when it reaches a predetermined level, the second pump operating at the second higher flow rate is turned off to return the system to a filtering condition.

6. The method as set forth in claim 1 in which a portion of the filtered liquid is introduced into the inlet zone to insure a constant pumping rate to the filter and any remaining filtered liquid is directed to a disposal area.

7. The method as set forth in claim 1 including the step of introducing air into the filter media during the cleaning cycle to effect an air scouring action in conjunction with the increased flow rate to effect cleaning of the filter in a shorter time period with a reduced quantity of water.

8. The method as set forth in claim 1 including the introduction of chemicals into the filter to aid in cleaning the filter media.

9. A method of filtration of water containing suspended solids, which comprises passing a volume of water plus solids of relatively low density through an inlet zone to and upwardly through a filter bed of particulate solids of higher density to a liquid zone above said bed at a first flow rate wherein the bed will remain in a non-fluidized state, discharging filtered water from the zone above said filter bed into a first zone at a first flow rate through a trough leading into a housing defining a first chamber immediately adjacent the trough for receiving the filtered water and a second spaced chamber for receiving washwater, said chambers being separated by a partition, effecting liquid movement upwardly through the filter bed at a second increased flow rate when a predetermined back pressure exists in said inlet zone due to clogging of said bed of particulate solids sufficient to induce a fluidized state for the particulate solids of said filter bed and to entrain the lower density solids causing said clogging, discharging said water and entrained lower density solids through said trough positioned above the filter bed, the increased flow rate of water being moved at a velocity that projects the water plus entrained solids over the partition into the second chamber.

10. A method for filtration of a liquid containing suspended solids, which comprises passing a volume of liquid plus solids of relatively low density through an inlet zone to and upwardly through a filter bed of particulate solids of higher density to a liquid receiving zone above said bed at a flow rate maintaining said bed in a non-fluidized state, discharging clarified liquid from said liquid receiving zone above said filter bed into a first zone through a flow course, sensing the liquid pressure in said inlet zone, effecting liquid movement upwardly through said filter bed at an increased flow rate for a preselected time interval when a predetermined back pressure exists in said liquid inlet zone due to clogging of said bed of particulate solids, sufficient to induce a fluidized state for the particulate solids of said filter bed and to entrain the lower density solids causing said clogging, passing said later liquid and entrained solids to said liquid receiving zone, discharging said latter liquid and entrained lower density solids through said flow course positioned above the filter bed, the increased flow rate of liquid producing a velocity which projects the latter liquid plus entrained solids into a second zone spaced from said first zone.

11. A method for filtration of a liquid containing suspended solids, which comprises passing a volume of liquid plus solids of relatively low density through an inlet zone to and upwardly through a filter bed of particulate solids of higher density to a liquid receiving zone above said bed at a velocity maintaining said bed in a non-fluidized state, discharging clarified liquid from said liquid receiving zone above said filter bed into a first zone through a flow course, providing a signal at a preselected time, effecting liquid movement upwardly through said filter bed at an increased flow rate in response to said signal for a preselected time interval sufficient to induce a fluidized state for the particulate solids of said filter bed and to entrain any lower density solids tending to cause clogging of said bed, passing said latter liquid and entrained solids to said liquid receiving zone, discharging said latter liquid and entrained lower density solids through said flow course positioned above the filter bed, the increased flow rate of said latter liquid producing a velocity which projects the liquid plus entrained solids into a second zone spaced from said first zone.

12. Apparatus for filtering a liquid containing suspended solids including a tank defining a bottom chamber, filter media supported in said tank above said bottom chamber, a trough disposed above said filter media and having an open end extended outwardly of said tank, housing means located adjacent the open end of the trough defining a first chamber immediately adjacent the end of the trough and a second chamber spaced from the end of said trough, pump means for introducing liquid into the bottom chamber at a first flow rate, and a second substantially higher flow rate, pressure responsive means for actuating the pump means to pump at said higher flow rate upon increase of pressure in said chamber due to the clogging of said filter media, whereby fluid will be introduced into said bottom filter chamber at a flow rate sufficient to fluidize the filter media and carry the entrapped particles into and out of the trough at a sufficiently high velocity to carry the liquid and entrained particles into said second chamber.

13. Apparatus as set forth in claim 12 in which said pump means includes a first and a second pump.

14. Apparatus for filtering a liquid containing suspended solids including a tank defining a bottom chamber, filter media located in said tank above said bottom chamber, a trough disposed above said filter media and having an open end extending outwardly of said tank, housing means located adjacent the open end of the trough defining a first chamber immediately adjacent the end of the trough and a second chamber spaced from the end of said trough, means for introducing liquid into the bottom chamber at a first flow rate, pump means for introducing liquid into said bottom chamber at a second substantially higher flow rate, pressure responsive means for actuating said pup means upon increase of pressure in said chamber due to the clogging of said filter media, whereby fluid will be introduced into said bottom filter chamber at a flow rate sufficient to fluidize the filter media and carry the entrapped particles into and out of the trough at a sufficiently high velocity to carry the liquid into said second chamber.

15. Apparatus as set forth in claim 12 wherein said second chamber defines outlet means, a holding tank in communication with said outlet means, whereby the liquid flowing into said second chamber flows into said holding tank, means in said holding tank responsive to the level of liquid in said holding tank whereby upon reaching a certain liquid level the second pump means will be deactuated and the apparatus will be returned to a filtering condition.

16. Apparatus as set forth in claim 12 including means for introducing air into said bottom chamber to effect scouring of the filter media to increase the efficiency of cleaning and reduce the amount of water required to clean the filter bed.

17. Apparatus as set forth in claim 12 including means for introducing chemicals into said bottom chamber for cleaning the filter media.

18. Apparatus as set forth in claim 12 in which means are provided for adjusting the position of the trough to insure that the trough is level relative to the tank so that proper flow patterns are established during the filtering and washing conditions.

19. Apparatus for filtering a liquid containing suspended solids including a first tank defining a bottom chamber, filter media located in said tank above said bottom chamber, a trough disposed above said filter media and having an open end extending outwardly thereof, housing means located adjacent the open end of the trough defining a first chamber immediately adjacent the end of the trough and a second chamber spaced from the end of said trough, first pump means for introducing liquid into the bottom chamber at a first flow rate, second pump means for introducing liquid into said bottom chamber at a second substantially higher flow rate, automatically operated timing means for actuating said second pump means at preselected intervals, whereby fluid will be introduced into said bottom filter chamber at a flow rate sufficient to fluidize the filter media and carry the entrapped particles into and out of the trough at a sufficiently high velocity to carry the liquid into said second chamber.

20. Apparatus for filtering a liquid containing suspended solids including a first tank defining a bottom chamber, filter media located in said tank above said bottom chamber, a trough disposed above said filter media and having an open end extending outwardly thereof, housing means located adjacent the open end of the trough defining a first chamber immediately adjacent the end of the trough and a second chamber spaced from the end of said trough, first pump means for introducing liquid into the bottom chamber at a first flow rate, second pump means for introducing liquid into said bottom chamber at a second substantially higher flow rate, pressure responsive means for sensing the pressure in said bottom chamber, timing means actuated by said pressure-responsive means for actuating said second pump means when the filter media becomes clogged, whereby fluid will be introduced into said bottom filter chamber at a flow rate sufficient to fluidize the filter media and carry the entrapped particles into and out of the trough at a sufficiently high velocity to carry the liquid into said second chamber.

21. Apparatus for filtering water containing suspended solids including a first tank defining a bottom chamber, filter media located in said tank above said bottom chamber, a trough disposed above said filter media and having an open end extending outwardly of the tank, housing means located adjacent the open end of the trough defining a first chamber defining a first outlet immediately adjacent the end of the trough for receiving filtered water and a second chamber spaced from the end of said trough for receiving washwater, first pump means for introducing water into the bottom chamber at a first flow rate, second pump means for introducing water into said bottom chamber at a second substantially higher flow rate, pressure responsive means for actuating said second pump means upon increase of pressure in said bottom chamber due to the clogging of said filter media, whereby water will be introduced into said bottom filter chamber at a flow rate sufficient to fluidize the filter media and carry the entrapped particles into and out of the trough at a sufficiently high velocity to carry the washwater into said second chamber, second tank means defining a first compartment for receiving the water to be filtered, including an outlet leading to the inlets of said pump means, a second compartment communicating with said first outlet for receiving filtered water from said filter, a trough means pivotally positioned between said last mentioned chambers, said trough means being positioned to receive filtered water from said first outlet, and float means in said first compartment responsive to the level of water in said first compartment to locate said tilting trough, whereby the trough will be positioned to direct water into said first compartment to maintain a constant flow rate to said pump therefrom.

22. An automatic up-flow filter comprising a filter tank containing a filter media, means supplying water to be filtered under pressure to the tank beneath the filter media, conduit means for receiving the filtered water from the tank above the filter media and for discharging the filtered water at a given destination, means responsive to a pressure built-up in the tank, below the filter media, for increasing the rate of flow of the water to the tank for cleaning the filter media and for directing said increased flow of water to said conduit means, and means cooperating with said conduit means and the increased rate of flow of the water to the tank for directing the water from the conduit means to a different destination than said given destination.

23. An automatic up-flow filter as in claim 22, said water discharging means including a trough disposed in the tank above the filter media and having a discharge end opening externally of the tank, said last mentioned means including a receptacle into which the trough discharges, said receptacle containing a baffle disposed below the level of the discharge trough, said receptacle having an outlet port in the bottom thereof located between the tank and baffle for receiving the water from the trough at the reduced flow rate of the water supply means, and said receptacle having a discharge port disposed on the opposite side of the baffle for receiving the washwater from the trough during the increased flow rate.

24. An automatic up-flow filter as in claim 23, and means for adjustably positioning the baffle relative to said receptacle ports.

25. An automatic up-flow filter as in claim 23, a holding tank having an outlet adjacent the top thereof communicating with said discharge port of the receptacle for receiving the washwater, said holding tank having a restricted outlet in the bottom thereof whereby washwater will accumulate in the holding tank during the increased flow rate of the water to the filter tank, and means responsive to the liquid level in the holding tank for reducing the rate of flow of the water to the filter tank.

26. An automatic up-flow filter as in claim 25, and means for returning the washwater from the holding tank to said water supply means.

27. Au automatic up-flow filter as in claim 22, said means supplying water to the filter tank comprising a first and a second electric pump, each connected to the filter tank below the filter media, and said means responsive to a pressure buildup in the tank comprising an electric switch for closing the electric circuit to the second pump.

28. An automatic up-flow filter as in claim 27, one of said destinations comprising a holding tank for receiving the washwater discharged from the filter tank when both pumps are in operation, and a liquid level responsive switch contained in the holding tank for interrupting the circuit of the second pump when the liquid in the holding tank rises to a predetermined level.

29. An automatic up-flow filter as in claim 27, said second pump having a flow rate substantially greater than the flow rate of the first pump.

* * * * *